(12) United States Patent
Moon et al.

(10) Patent No.: US 12,549,261 B2
(45) Date of Patent: Feb. 10, 2026

(54) ALAMOUTI DECODER HAVING FEEDFORWARD PHASE COMPENSATION STRUCTURE AND METHOD OF OPERATION THEREOF

(71) Applicant: ELECTRONICS AND TELECOMMUNICATIONS RESEARCH INSTITUTE, Daejeon (KR)

(72) Inventors: Sang Rok Moon, Daejeon (KR); Hun Sik Kang, Daejeon (KR); Jung Yeol Oh, Sejong-si (KR); Sun Hyok Chang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 18/830,368

(22) Filed: Sep. 10, 2024

(65) Prior Publication Data
US 2025/0202593 A1    Jun. 19, 2025

(30) Foreign Application Priority Data
Dec. 14, 2023    (KR) ..................... 10- 2023-0181561

(51) Int. Cl.
*H04B 10/61*    (2013.01)
*H04L 1/06*    (2006.01)

(52) U.S. Cl.
CPC ....... *H04B 10/6165* (2013.01); *H04L 1/0668* (2013.01)

(58) Field of Classification Search
CPC . H04B 10/6165; H04L 1/0668; H04L 1/0631; H04L 27/366
See application file for complete search history.

(56) References Cited

U.S. PATENT DOCUMENTS

| | | | |
|---|---|---|---|
| 8,170,127 B2 * | 5/2012 | Atungsiri | H04L 25/0204 375/267 |
| 2005/0141626 A1 | 6/2005 | Lee et al. | |
| 2006/0133527 A1 | 6/2006 | Yu et al. | |
| 2010/0020907 A1 * | 1/2010 | Rezvani | H04B 7/0848 455/273 |

(Continued)

FOREIGN PATENT DOCUMENTS

KR    10-1599074 B1    3/2016

OTHER PUBLICATIONS

MD. Saifuddin Faruk et al., "DSP algorithms for recovering single-carrier Alamouti coded signals for PON applications," Optics Express 24083, Oct. 17, 2016, vol. 24, No. 21.

*Primary Examiner* — Sung S Ahn

(57) ABSTRACT

According to an aspect of the present disclosure, there is provided an alamouti decoding method having a feedforward phase compensation structure, the Alamouti decoding method comprising: detecting a phase of each of a plurality of symbols received through a plurality of antennas; performing first phase compensation on the detected phase using a pilot tone included in the plurality of symbols; converting the first phase compensated serial symbol sequence into a parallel symbol sequence; decoding the parallel symbol sequence by a decoder; and performing second phase compensation on the decoded symbol sequence.

20 Claims, 5 Drawing Sheets

(56) References Cited

U.S. PATENT DOCUMENTS

2011/0280351 A1 11/2011 Yang et al.
2012/0045028 A1 2/2012 Schmitt et al.
2012/0189085 A1 7/2012 Shi

* cited by examiner

ALAMOUTI DECODER HAVING FEEDFORWARD PHASE COMPENSATION STRUCTURE AND METHOD OF OPERATION THEREOF

CROSS-REFERENCE TO RELATED APPLICATION

The present application claims priority to Patent Application No. 10-2023-0181561, filed in Korea Intellectual Property Office on Dec. 14, 2023, the entire contents of which are incorporated herein by reference.

TECHNICAL FIELD

The present disclosure relates to an Alamouti decoder having a feedforward phase compensation structure and a method of operating the same.

BACKGROUND

The contents described below simply provides background information related to the present embodiment and does not constitute prior art.

Generally, in communication systems, pre-agreed signals, such as pilot signals, have been used for synchronization, frequency offset, and channel estimation. In this case, phase noise may occur in the process of transmitting/receiving the pre-agreed signals. Here, phase noise is a more complex phenomenon than frequency offset and has a very significant impact on system performance.

Generally, the Alamouti code is a type of space-time block code, and is a code used to obtain maximum diversity gain at a receiving end when a signal is transmitted from two transmitting ends to one receiving end. Two transmitting ends transfer the same information to one receiving end. However, when two transmitting ends transmit the same signal, signals arriving at the receiving end through different paths may cause mutual interference, resulting in performance degradation. Therefore, a method for preventing performance degradation caused due to mutual interference between signals arriving at the receiving end through different paths when two transmitting ends transmit the same signal is required.

SUMMARY

In view of the above, the present disclosure provides an apparatus and method for preventing performance degradation caused due to mutual interference between signals arriving at a receiving end through different paths when two transmitting ends transmit the same signal.

The present disclosure provides an apparatus and method for improving performance by separating a phase compensation portion from a feedback loop within an Alamouti decoder in a communication system.

The problems to be solved by the present disclosure are not limited to the problems mentioned above, and other problems not mentioned may be clearly understood by those skilled in the art from the description below.

According to an aspect of the present disclosure, there is provided an alamouti decoding method having a feedforward phase compensation structure, the Alamouti decoding method comprising: detecting a phase of each of a plurality of symbols received through a plurality of antennas; performing first phase compensation on the detected phase using a pilot tone included in the plurality of symbols; converting the first phase compensated serial symbol sequence into a parallel symbol sequence; decoding the parallel symbol sequence by a decoder; and performing second phase compensation on the decoded symbol sequence.

According to an aspect of the present disclosure, there is provided an alamouti decoding device having a feedforward phase compensation structure, the Alamouti decoding device comprising: a memory including an instruction; and a processor configured to, by executing the instruction, detect a phase of each of a plurality of symbols received through a plurality of antennas, perform first phase compensation on the detected phase using a pilot tone included in the plurality of symbols, convert the first phase compensated serial symbol sequence into a parallel symbol sequence, decode the parallel symbol sequence in a decoder, and perform second phase compensation on the decoded symbol sequence.

The present disclosure may prevent performance degradation due to mutual interference between signals arriving at a receiving end through different paths when two transmitting ends transmit the same signal.

The present disclosure may improve performance by separating a feedback phase compensation loop within an Alamouti decoder in a communication system.

In the present disclosure, performance degradation of carrier phase estimation/compensation due to a feedback loop may be reduced by removing a phase compensation portion in an Alamouti decoder from a feedback loop and implementing the phase compensation portion separately.

The effects of the present disclosure are not limited to the effects mentioned above, and other effects not mentioned may be clearly understood by those skilled in the art from the description below.

DETAILED DESCRIPTION

Figure 1:
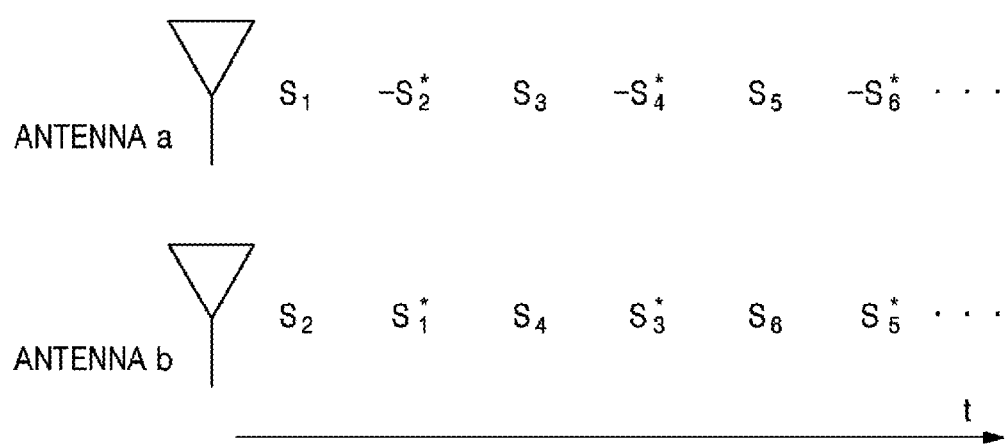
FIG. 1 is a diagram of an Alamouti code encoded transmission signal.

Hereinafter, some embodiments of the present disclosure will be described in detail using exemplary drawings. It should be noted that in assigning reference numerals to components in each drawing, the same components are given the same reference numerals as much as possible even when they are shown in different drawings. In addition, in describing the present disclosure, if it is determined that a detailed description of a related known configuration or function may obscure the gist of the present disclosure, the detailed description will be omitted.

In describing components of the embodiment according to the present disclosure, designations such as first, second, i), ii), a), b), and the like may be used. These designations are only used to distinguish the component from other components, and the nature, order, or sequence of the component is not limited by the designations. In the present specification, when it is described that a part 'includes or comprises' or 'has' a certain component, this means that it does not exclude other components but may further include other components, unless explicitly stated to the contrary.

The detailed description set forth below in conjunction with the accompanying drawings is intended to describe exemplary embodiments of the present disclosure and is not intended to represent the only embodiments in which the present disclosure may be practiced.

When two transmitting ends transmit the same signal to a receiving end, signals arriving at the receiving end through different paths may cause mutual interference, resulting in performance degradation. To prevent this, a method of encoding and transmitting signals from two transmitting ends is mainly used, and the Alamouti code is one of the most representative codes.

FIG. 1 is a diagram of an Alamouti code encoded transmission signal.

In the Alamouti code, a transmission signal is encoded in units of two symbols. It is assumed that a first symbol is S1 and a second symbol is S2.

Referring to FIG. 1, a signal transmitted from antenna a may be expressed as S1,-S2*, S3,-S4*, S5,-S6* according to time, and a signal S transmitted from antenna b may be expressed as S2, S1*, S4, S3*, S6, S5* according to time.

If the transmitted signal is expressed as x and the received signal as y, the received signal may satisfy Equation 1.

$$\begin{bmatrix} y_1 \\ y_2^* \end{bmatrix} = \begin{bmatrix} h_{aa}\, e^{i\theta} & h_{ab}\, e^{i\theta} \\ h_{ba}^*\, e^{-i\theta} & -h_{bb}^*\, e^{-i\theta} \end{bmatrix} \begin{bmatrix} x_1 \\ x_2 \end{bmatrix} + \begin{bmatrix} n_1 \\ n_2 \end{bmatrix} \quad \text{[Equation 1]}$$

Here, n represents noise, and subscripts 1 and 2 represent first and second symbols, respectively. The Alamouti code performs encoding/decoding in units of two symbols. Also, H represents a transfer function of a channel, and $\theta$ represents a carrier frequency offset or a carrier phase rotated by phase noise.

If noise is ignored in Equation 1, the transmitted signal may be decoded as in Equation 2.

$$\begin{bmatrix} \hat{x}_1 \\ \hat{x}_2 \end{bmatrix} = \begin{bmatrix} h_{aa}\, e^{i\theta} & h_{ab}\, e^{i\theta} \\ h_{ba}^*\, e^{-i\theta} & -h_{bb}^*\, e^{-i\theta} \end{bmatrix}^{-1} \begin{bmatrix} y_1 \\ y_2^* \end{bmatrix} \quad \text{[Equation 2]}$$

As shown in Equation 2, to recover the signal, a channel response expressed by h and a phase of the carrier expressed by $\theta$ are estimated, and the estimated values are applied to a decoding matrix. In other words, Alamouti decoding, channel-response equalization, and carrier phase recovery operations should be performed simultaneously, as shown in FIG. 2.

Figure 2:
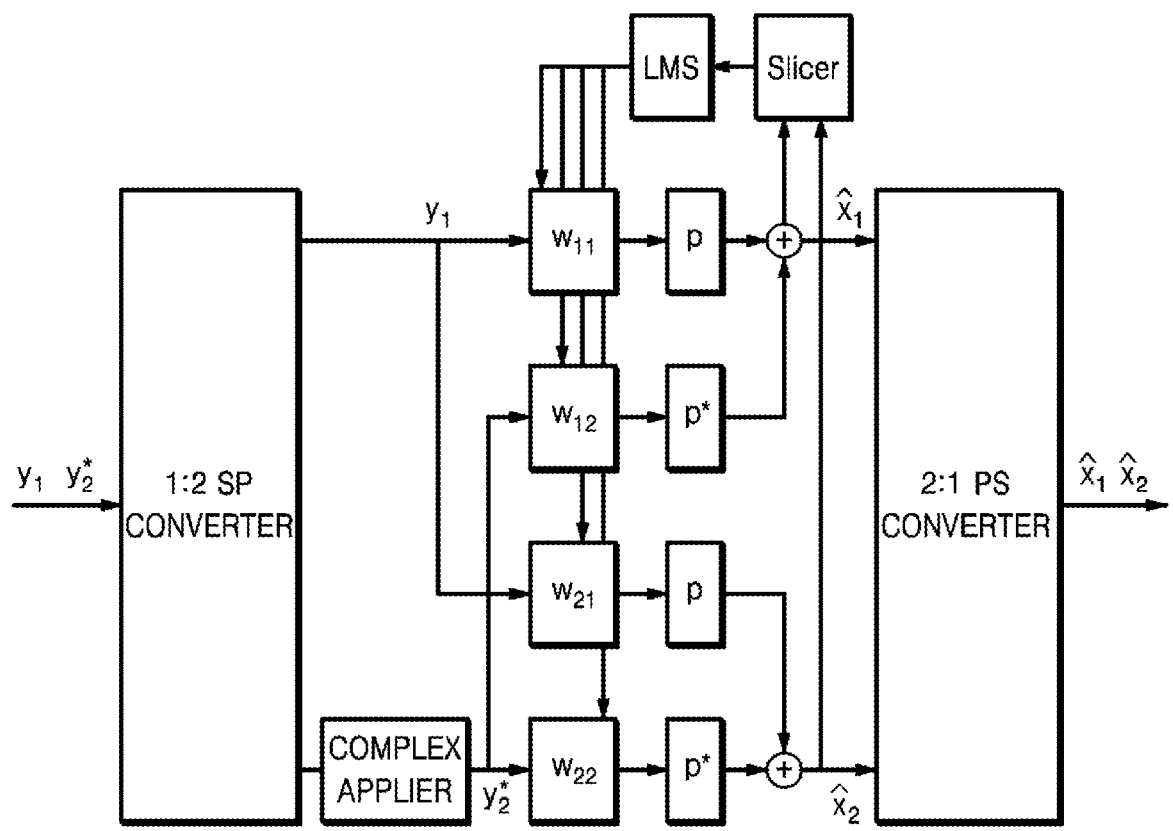
FIG. 2 is a diagram illustrating a channel response equalizer and a carrier phase recovery device combined with an Alamouti decoder according to an embodiment of the present disclosure.

FIG. 2 is a diagram illustrating a channel response equalizer and a carrier phase recovery device combined with an Alamouti decoder according to an embodiment of the present disclosure.

w denotes a filter factor of a channel equalizer, and p denotes a phase of the estimated carrier wave.

When compared to the channel response, w and p satisfy the relationship shown in Equation 3.

$$\begin{bmatrix} w_{11}\, p & w_{12}\, p^* \\ w_{21}\, p & w_{22}\, p^* \end{bmatrix} \approx \begin{bmatrix} h_{aa}\, e^{i\theta} & h_{ab}\, e^{i\theta} \\ h_{ba}^*\, e^{-i\theta} & -h_{bb}^*\, e^{-i\theta} \end{bmatrix}^{-1} \quad \text{[Equation 3]}$$

A received signal y input to a receiver through a channel is recovered by a channel response equalizer expressed by w and p and a carrier phase recovery device (the recovered signal may be expressed as "x_hat"). An error is estimated from the recovered signal, and the estimated error is fed back to finely adjust w and p. Algorithms for adjusting w and p include, but are not limited to, the least-mean-square (LMS) algorithm. In FIG. 2, after applying LMS, the estimated error is input to each of w11, w12, w21, and w22.

As described above, the estimated error is fed back and used for subsequent signal recovery. The problem is that there is a time interval between a symbol used for error estimation and a symbol corrected based on the estimated error. If a channel response or a phase of a carrier changes between the time interval, a difference occurs between an estimated value and a compensation value, resulting in performance degradation. In the case of channels, since they change relatively slowly, the time interval problem may not be significant. However, because the carrier phase changes relatively quickly, performance may deteriorate depending on the time interval.

When actually implemented in a communication system, the time interval may further increase depending on a speed of a chip of a signal processing device. In addition, the problem of time intervals may become more serious in a parallelism structure that is essentially used when implementing high-speed communication chips. Here, parallelism technology is a technology that parallelizes signals received by a receiver and processes the signals simultaneously. If parallelism technology is applied, high-speed communication signals may be processed even with low operating speed chips, but a time difference between 'estimation' and 'compensation' increases as much as the level of parallelism. Since parallelism is essential in implementing high-speed communication chips, it is essential to solve the problem of performance degradation caused by a feedback structure for actual implementation. Therefore, an embodiment of the present disclosure proposes a feedforward phase compensation structure for the time difference between 'estimation' and 'compensation'.

Figure 3A:
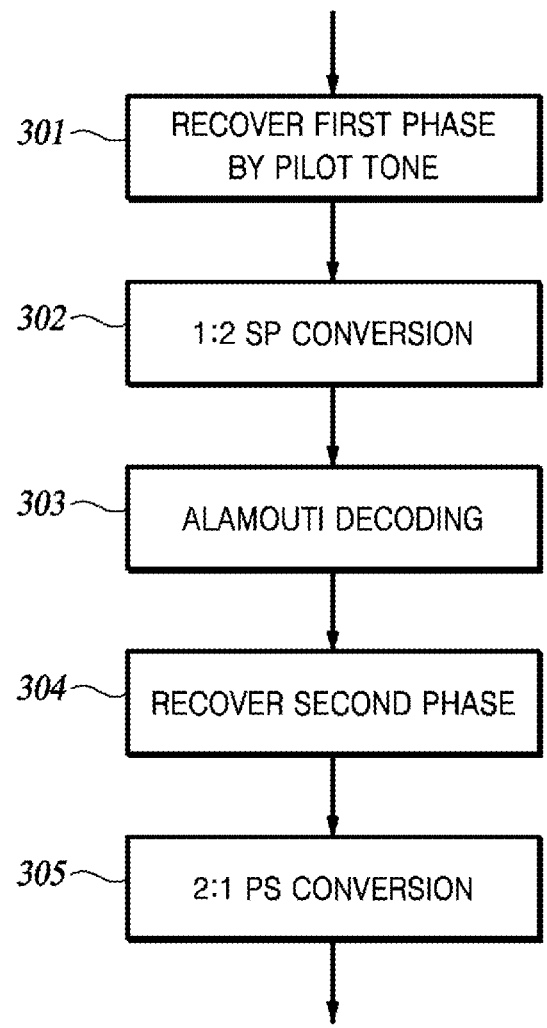
FIGS. 3A and 3B are a flowchart illustrating an Alamouti decoding method having a feedforward phase compensation structure according to an embodiment of the present disclosure.
Figure 3B:
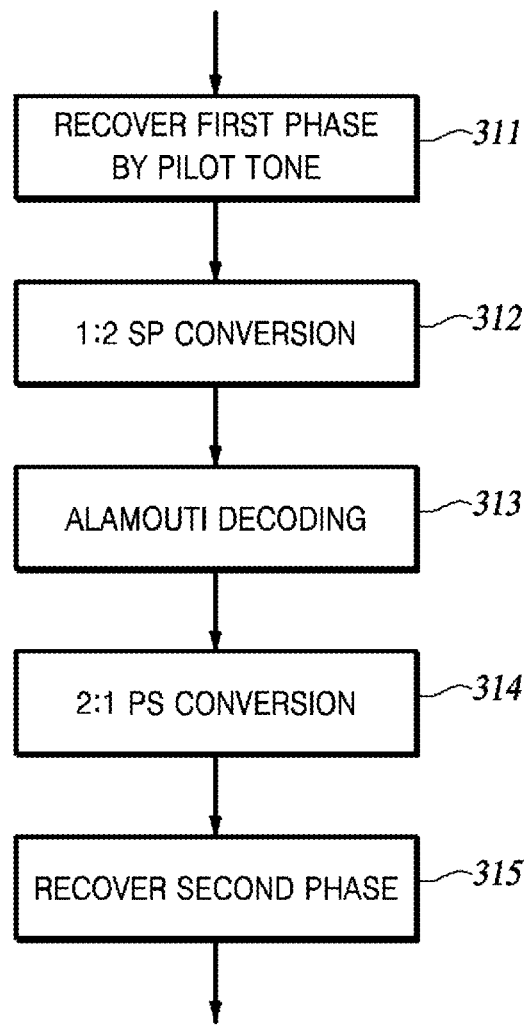

FIGS. 3A and 3B are a flowchart illustrating an Alamouti decoding method having a feedforward phase compensation structure according to an embodiment of the present disclosure.

A portion in which performance deterioration occurs due to feedback loop is mainly a carrier phase recovery portion. Therefore, in an embodiment of the present disclosure, the performance degradation problem may be solved by removing the carrier phase recovery portion by the Alamouti decoder and adding a separate carrier phase recovery device.

FIG. 3A is a flowchart illustrating an Alamouti decoding method having a feedforward phase compensation structure according to an embodiment of the present disclosure.

In step 301, a receiver recovers a phase of a received signal using a pilot tone (referred to as "first phase recovery") and outputs a serial symbol sequence. Prior to the Alamouti decoding operation, approximate phase error compensation is performed.

In order to perform approximate phase error compensation, a transmitter periodically inserts the same signal (e.g., a pilot tone) as agreed and transmits the same to the receiver. The receiver may measure a phase change of the received pilot tone to estimate a phase change of a carrier wave.

A specific method of estimating a phase change may include a method of measuring auto-correlation of a pilot tone and is not limited to a specific type.

As an example of using the auto-correlation method, the estimated phase may be expressed by Equation 4.

$$\varphi(d) = \frac{1}{L} \text{angle}\left(\sum_m r^*(d+m-L) * r(d+m)\right) \quad \text{[Equation 4]}$$

Here, φ(d) is the estimated phase at a time index d, and L denotes an interval between inserted pilot tones, and m denotes a time index of a pilot tone included in a time window used in phase estimation. r(d) denotes a pilot tone signal received at the time index d.

In step 302, the receiver converts the input serial symbol sequence into a parallel symbol sequence. Here, the receiver performs 1:2 serial parallel (SP) conversion (conversion from serial to parallel). Here, 1:2 means 1 port (i.e. serial) for input and 2 ports (i.e. parallel) for output. More specifically, when a serial signal, such as abcdefgh, is received, output port #1 outputs aceg, and output port #2 outputs bdfh.

The receiver applies Alamouti decoding to the parallel converted symbol sequence in step 303. Here, in addition to the Alamouti decoding method, various decoding methods may be applied and are not limited to a specific type. The phase-recovered signal is inserted into the Alamouti decoder (without a phase error compensation portion) to perform decoding and a channel response compensation.

The receiver recovers the phase from the decoded symbol sequence in step 304 (referred to as "second phase recovery"). To compensate for the residual phase error, precise phase compensation (second phase recovery) is performed. An example of a phase estimation method for precise phase compensation may be blind phase search (BPS). The BPS method is a method of preparing a list of phases that may be candidates for phase estimation, performing phase recovery by substituting the phases on the list one by one, and selecting a phase with the least error.

In the Alamouti decoder, a phase recovery portion is removed from a feedback loop and implemented separately, and the second phase recovery operation in step 304 is performed in a separately implemented phase recovery device.

In step 305, the receiver converts an input serial symbol sequence whose second phase is recovered into a parallel symbol sequence. Here, the receiver performs 2:1 PS conversion (parallel to serial conversion).

Here, 2:1 means 2 ports (i.e. parallel) for input and 1 port (i.e. serial) for output. More specifically, when abcd is input to input port 1 and efgh is input to input port 2 simultaneously, output port 1 alternately outputs the signals coming from each input port. For example, output port 1 outputs like aebfcgdh.

FIG. 3B is a flowchart illustrating an Alamouti decoding method having a feedforward phase compensation structure according to another embodiment of the present disclosure.

In step 311, the receiver recovers the phase of the received signal using a pilot tone ("first phase recovery") and outputs a serial symbol sequence.

The receiver converts the input serial symbol sequence into a parallel symbol sequence in step 312. Here, the receiver performs 1:2 SP conversion (conversion from serial to parallel).

The receiver applies Alamouti decoding to the parallel converted symbol sequence in step 313. Here, the decoding method may include various decoding methods in addition to the Alamouti decoding method, and is not limited to a specific type.

In step 314, the receiver converts the decoded serial symbol sequence into a parallel symbol sequence. Here, the receiver performs 2:1 PS conversion (conversion from parallel to serial).

The receiver recovers the phase from the parallel converted symbol sequence ("second phase recovery") in step 315.

In the Alamouti decoder, the phase recovery portion is removed from the feedback loop and implemented separately, and the second phase recovery operation in step 315 is performed in a separately implemented phase recovery device.

Figure 4:
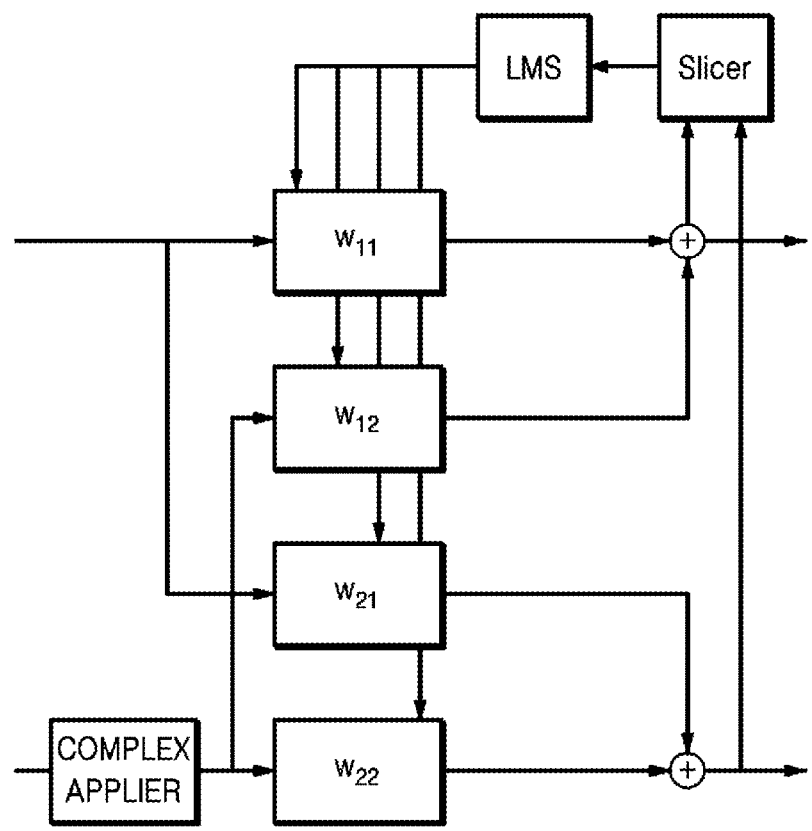
FIG. 4 is a diagram of an Alamouti decoder without phase recovery according to an embodiment of the present disclosure.

FIG. 4 is a diagram of an Alamouti decoder without phase recovery according to an embodiment of the present disclosure.

FIG. 4 is a diagram of an Alamouti decoder in which phase recovery is removed compared to FIG. 2.

Referring to FIG. 4, the phase-recovered signal (signal input to each of w11, w12, w21, and w22 after applying LMS) according to an embodiment of the present disclosure is inserted into the Alamouti decoder (from which the phase error compensation portion has been removed) and then is performed decoding and a channel response compensation. Thereafter, to compensate for a residual phase error, precise phase compensation is performed in a separately implemented phase recovery device. The phase estimation method for precise phase compensation may include, for example, the BPS method, but is not limited to a specific type. The BPS method is a method of preparing a list of phases that may be candidates for phase estimation, performing phase recovery by substituting the phases on the list one by one, and selecting a phase with the least error.

In an embodiment of the present disclosure, the phase recovery portion of the Alamouti decoder is removed from the feedback loop and implemented separately, thereby reducing the performance degradation of carrier phase estimation/compensation due to the feedback loop.

At least some of the components described in the embodiments of the present disclosure may be implemented as a hardware element including at least of a digital signal processor (DSP), a processor, a network controller, an application-specific IC (ASIC), a programmable logic device (FPGA, etc.), and other electronic devices, or combinations thereof. In addition, at least some of the functions or processes described in the embodiments may be implemented as software, and the software may be stored in a recording medium. At least some of the components, functions, and processes described in the embodiments of the present disclosure may be implemented through a combination of hardware and software.

Methods according to embodiments of the present disclosure may be written as a program that may be executed on a computer, and may also be implemented in various recording mediums, such as magnetic storage mediums, optical read mediums, and digital storage mediums.

Various techniques described herein may be implemented in digital electronic circuitry, or in computer hardware, firmware, software, or in combinations thereof. The techniques may be implemented as a computer program product, i.e., a computer program tangibly embodied in an information carrier, e.g., in a machine-readable storage device (computer-readable medium) or in a propagated signal for execution by, or to control the operation of, data processing apparatus, e.g., a programmable processor, a computer, or multiple computers. A computer program may be written in any form of a programming language, including compiled or interpreted languages and may be deployed in any form including a stand-alone program or a module, component, subroutine, or other unit suitable for use in a computing environment. A computer program may be deployed to be executed on one computer or on multiple computers at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer may include a processor for executing instructions and one or more memory devices for storing instructions and data. Generally, a computer will also include or be coupled to receive data from, transfer data to, or perform both on one or more mass storage devices for storing data, e.g., magnetic, magneto-optical disks, or optical disks. Examples of information carriers suitable for embodying computer program instructions and data include semiconductor memory devices, for example, magnetic media, such as a hard disk, a floppy disk, and a magnetic tape, optical media, such as a compact disk read only memory (CD-ROM), a digital video disk (DVD), etc. and magneto-optical media, such as a floptical disk, and a read only memory (ROM), a random access memory (RAM), a flash memory, an erasable programmable ROM (EPROM), and an electrically erasable programmable ROM (EEPROM). A processor and a memory may be supplemented by, or integrated into, a special purpose logic circuit.

The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

In addition, non-transitory computer-readable mediums may be any available mediums that may be accessed by a computer and includes both computer storage mediums and transmission mediums.

What is claimed is:

1. An Alamouti decoding method having a feedforward phase compensation structure, the Alamouti decoding method comprising:
    detecting a phase of each of a plurality of symbols received through a plurality of antennas;
    performing first phase compensation on the detected phase using a pilot tone included in the plurality of symbols;
    converting the first phase compensated serial symbol sequence into a parallel symbol sequence;
    decoding the parallel symbol sequence by a decoder; and
    performing second phase compensation on the decoded symbol sequence.

2. The Alamouti decoding method of claim 1, wherein the decoder has a structure in which a phase error compensation module is removed.

3. The Alamouti decoding method of claim 2, wherein the performing of the second phase compensation includes:
    performing the second phase compensation on the decoded symbol sequence; and
    converting the second phase compensated parallel symbol sequence into a serial symbol sequence,
    wherein the second phase compensation is performed in the phase error compensation module configured separately from the decoder.

4. The Alamouti decoding method of claim 2, wherein the performing of the second phase compensation includes:
    converting the decoded parallel symbol sequence into a serial symbol sequence; and
    performing the second phase compensation on the converted serial symbol sequence, and
    wherein the second phase compensation is performed in the phase error compensation module configured separately from the decoder.

5. The Alamouti decoding method of claim 1, wherein an estimated phase estimated in the process of performing the first phase compensation satisfies Equation below:

$$\varphi(d) = \frac{1}{L} \text{angle} \left( \sum_m r^*(d+m-L) * r(d+m) \right) \quad \text{[Equation]}$$

wherein $\varphi(d)$ is an estimated phase at a time index d, L denotes an interval between inserted pilot tones, m denotes a time index of the pilot tone included in a time window used in phase estimation, and r(d) denotes a pilot tone signal received in the time index d.

6. The Alamouti decoding method of claim 1, wherein the phase estimation method for the first phase compensation includes a method of measuring auto-correlation of the pilot tone.

7. The Alamouti decoding method of claim 1, wherein a phase estimation method for the second phase compensation includes a blind phase search (BPS) method.

8. The Alamouti decoding method of claim 1, wherein the decoder includes an Alamouti decoder.

9. The Alamouti decoding method of claim 1, wherein the plurality of symbols include orthogonal frequency division multiplexing (OFDM) symbols.

10. The Alamouti decoding method of claim 1, wherein the decoder has a feedback structure.

11. An Alamouti decoding device having a feedforward phase compensation structure, the Alamouti decoding device comprising:
    a memory including an instruction; and
    a processor configured to, by executing the instruction, detect a phase of each of a plurality of symbols received through a plurality of antennas, perform first phase compensation on the detected phase using a pilot tone included in the plurality of symbols, convert the first phase compensated serial symbol sequence into a parallel symbol sequence, decode the parallel symbol sequence in a decoder, and perform second phase compensation on the decoded symbol sequence.

12. The Alamouti decoding device of claim 11, wherein the decoder has a structure in which a phase error compensation module is removed.

13. The Alamouti decoding device of claim 12, wherein the processor is configured to perform the second phase compensation on the decoded symbol sequence and convert the second phase compensated parallel symbol sequence into a serial symbol sequence, wherein the second phase compensation is performed in the phase error compensation module configured separately from the decoder.

14. The Alamouti decoding device of claim 12, wherein the processor is configured to convert the decoded parallel symbol sequence into a serial symbol sequence and perform the second phase compensation on the converted serial symbol sequence, and
wherein the second phase compensation is performed in the phase error compensation module configured separately from the decoder.

15. The Alamouti decoding device of claim 11, wherein an estimated phase estimated in the process of performing the first phase compensation satisfies Equation below:

$$\varphi(d) = \frac{1}{L} \text{angle}\left(\sum_m r^*(d+m-L) * r(d+m)\right)$$ [Equation]

wherein ϕ(d) is an estimated phase at a time index d, L denotes an interval between inserted pilot tones, m denotes a time index of the pilot tone included in a time window used in phase estimation, and r(d) denotes a pilot tone signal received in the time index d.

16. The Alamouti decoding device of claim 11, wherein the phase estimation method for the first phase compensation includes a method of measuring auto-correlation of the pilot tone.

17. The Alamouti decoding device of claim 11, wherein a phase estimation method for the second phase compensation includes a blind phase search (BPS) method.

18. The Alamouti decoding device of claim 11, wherein the decoder includes an Alamouti decoder.

19. The Alamouti decoding device of claim 11, wherein the plurality of symbols include orthogonal frequency division multiplexing (OFDM) symbols.

20. The Alamouti decoding device of claim 11, wherein the decoder has a feedback structure.

* * * * *